United States Patent
Brindle (10) Patent No.: US 9,690,594 B2
(45) Date of Patent: Jun. 27, 2017

(54) SYSTEM FOR CONFIGURING A CONTROLLER

(71) Applicant: Honeywell International Inc., Morristown, NJ (US)

(72) Inventor: Ralph C. Brindle, Edina, MN (US)

(73) Assignee: Honeywell International Inc., Morris Plains, NJ (US)

( * ) Notice: Subject to any disclaimer, the term of this patent is extended or adjusted under 35 U.S.C. 154(b) by 731 days.

(21) Appl. No.: 13/873,015

(22) Filed: Apr. 29, 2013

(65) Prior Publication Data
US 2014/0325194 A1 Oct. 30, 2014

(51) Int. Cl.
*G06F 9/44* (2006.01)

(52) U.S. Cl.
CPC .................................. *G06F 9/4401* (2013.01)

(58) Field of Classification Search
CPC ..... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | |
|---|---|---|---|
| 6,411,615 B1* | 6/2002 | DeGolia, Jr. | H04L 29/06027 370/352 |
| 8,224,888 B2 | 7/2012 | Brindle | |
| 8,443,065 B1* | 5/2013 | White | H04L 45/02 370/254 |
| 8,826,385 B2* | 9/2014 | Congdon | H04L 63/105 726/12 |
| 8,970,195 B2* | 3/2015 | Zambetti | H02M 3/1584 323/283 |
| 2005/0071446 A1* | 3/2005 | Graham et al. | 709/223 |
| 2007/0078956 A1 | 4/2007 | VanGompel | |
| 2008/0155573 A1* | 6/2008 | Dawra | G06F 9/44505 719/328 |
| 2009/0069081 A1* | 3/2009 | Thorner | A63F 13/24 463/30 |

(Continued)

FOREIGN PATENT DOCUMENTS

DE 102009005902 6/2010

OTHER PUBLICATIONS

U.S. Appl. No. 13/668,153, filed Nov. 2, 2012.

*Primary Examiner* — Thomas Lee
*Assistant Examiner* — Mohammad A Rahman
(74) *Attorney, Agent, or Firm* — Seager, Tufte & Wickhem, LLP (57) ABSTRACT

A system for configuring a controller without a file transfer. Programmable controllers may typically use configuration data structures that are transferred to the controller via a file transfer mechanism. The present controller does not necessarily need a tool with file transfer capability, but only a capability to read and write network variables. Configuration data structures may incorporate replacement specifications, and replacement constants representing replacement data to be selected. Changes of value in public variables may be identified as being replacement variables by virtue of their presence in the replacement specifications. When such changes of values are detected, instructions in the replacement specifications may detail how to modify the configuration file content associated with those public variables.

22 Claims, 7 Drawing Sheets

(56) References Cited

U.S. PATENT DOCUMENTS

| | | |
|---|---|---|
| 2010/0023605 A1 | 1/2010 | Li et al. |
| 2010/0249951 A1 | 9/2010 | Klug et al. |
| 2010/0290348 A1* | 11/2010 | Stanislaus et al. ........... 370/245 |
| 2010/0325704 A1* | 12/2010 | Etchegoyen ............ G06F 21/31 726/5 |
| 2011/0087774 A1* | 4/2011 | Pope ..................... G06F 9/4856 709/224 |
| 2011/0173550 A1* | 7/2011 | Oetzel ................. G06F 3/04817 715/757 |
| 2011/0174893 A1* | 7/2011 | Allan .................. A01C 15/122 239/8 |
| 2012/0084406 A1* | 4/2012 | Kumbalimutt ............... 709/220 |

* cited by examiner

SYSTEM FOR CONFIGURING A CONTROLLER

BACKGROUND

The present disclosure pertains to controllers and particularly to configurable controllers.

SUMMARY

The disclosure reveals a system for configuring a controller without a file transfer. Programmable controllers may typically use configuration data structures that are transferred to the controller via a file transfer mechanism. The present controller does not necessarily need a tool with file transfer capability, but only a capability to read and write network variables. Configuration data structures may incorporate replacement specifications, and replacement constants representing replacement data to be selected. Changes of value in public variables may be identified as being replacement variables by virtue of their presence in the replacement specifications. When such changes of values are detected, instructions in the replacement specifications may detail how to modify the configuration file content associated with those public variables.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Programmable controllers may typically use configuration data structures that are transferred to the controller via a file transfer mechanism. An efficient means of creating a configurable (not fully programmable) controller may be to use the programmable platform, but ship the controller with a pre-built control application. To improve its appeal in the marketplace, a configurable controller should be configurable in the shortest possible "download" time and require only the simplest of network tools. The controller should not need a tool with file transfer capability, but only a capability to read and write network variables.

A challenge is to make use of the programmable platform and its configuration data structures during development, and yet ship a product that can be configured using only network variable writes.

The replacement mechanism may use a new configuration data structure to relate a nonvolatile network variable (Network Configuration Input or NCI) to a specific item of configuration data resident in the controller. A process running on the controller may look for changes of value in any of the NCIs involved, and upon a change of value, force a corresponding change to the related underlying configuration structure item. In this way, a write to the NCI may have the same effect as modifying the application and downloading it via file transfer, but in much less time and with greater convenience.

The present approach may use a generic specification mechanism for relating the NCI value to the underlying configuration structure, so it can be applied to any such structure, even to structures not yet envisioned or implemented. The replacement specifications may support a rich set of configuration data types to be "replaced". The NCI value may be used directly as the replacement data, or may act as an enumeration to select replacement data from an array of choices within the replacement specification.

Previous developments of configurable controllers may have required a complete ground up development to tie the configuration NCIs to the application. The present disclosure may reveal substantial reuse of programmable controller technology, speeding development time to market. Where it is convenient to connect a configuration NCI to the application, it may be done using the existing programmable controller infrastructure. Where access to the file resident configuration data structures is required, an NCI-driven "replacement" may be used.

The new configuration data structures may include replacement specifications, and replacement constants representing replacement data to be selected via an enumeration value.

Each replacement specification may include a public variable representing the storage to which the driving NCI is attached. This may be the source of the replacement data, or the enumeration value driving the selection of the replacement data.

Each replacement specification may include a file ID and a file offset representing the destination of the replacement. Typically, this may be a field of a configuration data structure.

Each replacement specification may include the data type being replaced, a mask, so that bit fields can be replaced without affecting adjacent bits, and the type of operation to be performed to get the replacement data. Types of operations may include direct replacement, where the public variable value is the replacement data, direct replacement with limits, where a public variable value outside the limits results in a predetermined "else" replacement data value, or enumerated replacement, where the public variable value is used as an index into a table of replacement data values.

To be truly useful to the developer, a tool may be needed to turn developer-centric elements like structure field names and wiresheet block names into replacement specifications containing file IDs and offsets suitable for use by the controller. A proper implementation may include a translation tool to generate downloadable replacements from a set of developer-oriented specifications. Such a tool is considered outside the scope of the present disclosure.

Figure 1:
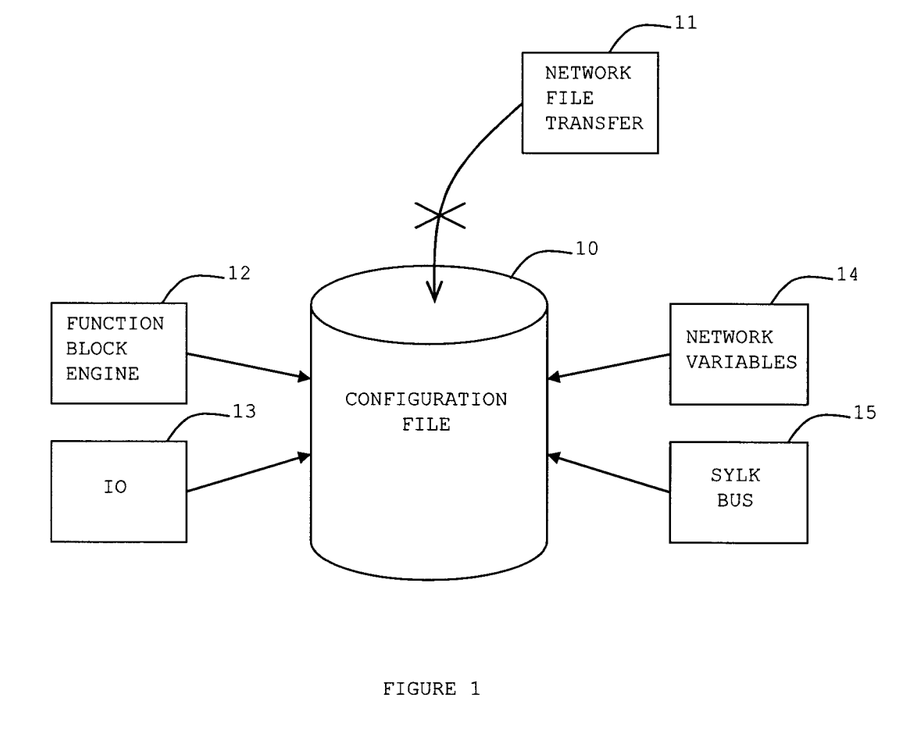
FIG. 1 is a diagram of a configuration file revealing a previous network file transfer to a configuration file.

FIG. 1 is a diagram of a configuration file 10 revealing a previous network file transfer 11 to the configuration file 10.

Various items such as a function block engine 12, IO 13, network variables 14 and SYLK™ bus 15 may be written to and/or read from configuration file 10. Other items may be read to or from configuration block 10.

Figure 2:
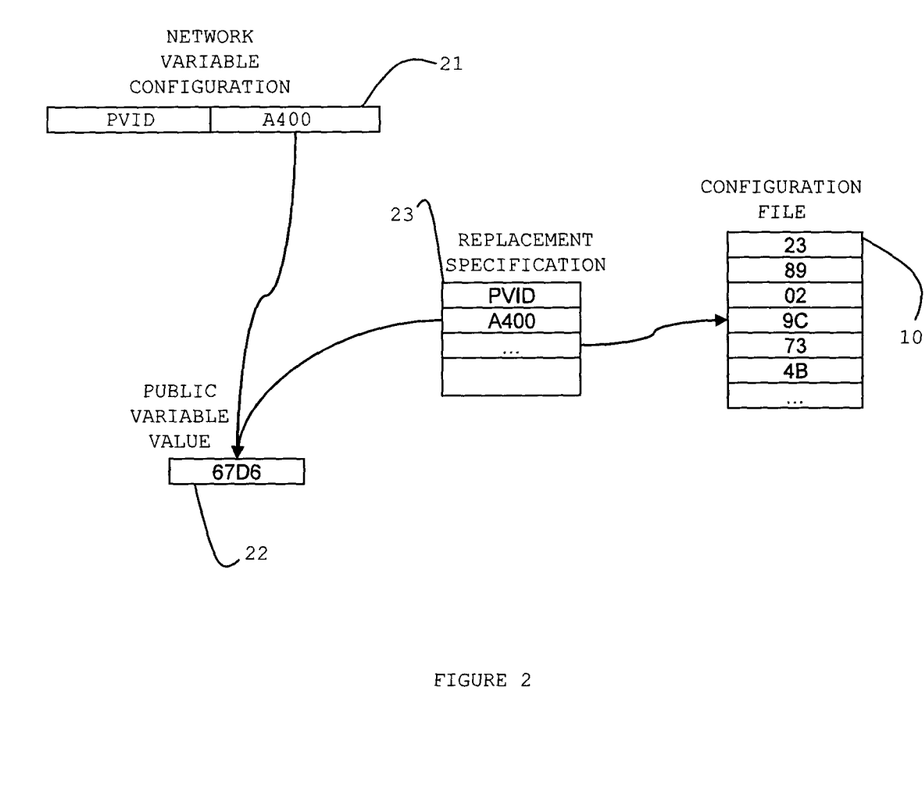
FIG. 2 is a diagram of a network variable configuration with data written to a public variable value.

FIG. 2 is a diagram that may illustrate the relationship of a configuration file 10, which otherwise would normally be downloaded via a file transfer 11 in a programmable controller, to a network variable used to manipulate the content of the configuration file 10 without using file transfer 11 in a configurable controller.

The Figure may show a network variable configuration 21 with data written to a public variable value 22. Data may be read from the public variable value 22 by the public variable value 22 by a replacement specification 23. Data may be written to configuration file 10 from replacement specification 23.

When the network variable is written, the controller may access network variable configuration data to identify the internal public variable to which the network variable is mapped via a public variable ID (PVID). The value of the public variable may be changed when the network variable is written. This may be a standard functionality that applies to either a programmable or configurable controller.

A separate replacement process running in the controller may periodically scan the replacement specifications looking for changes of value in public variables identified as being "replacement" public variables by virtue of their presence in the replacement specifications. When such a change of value is detected, additional instructions in the replacement specification may detail how to modify the configuration file content associated with that public variable.

There may be numerous replacement specifications that may in fact be an array of like specifications, each of which identifies a single public variable and the instructions for how to modify a configuration file based on the value of that variable. The replacement process may scan for changes in virtually all of the replacement public variables in the array. The examples that follow may show only a single network variable and replacement specification for simplicity.

There may also be multiple configuration files, each of which is identified by a file ID. The replacement specification may include a file ID, so that it can be used generally to manipulate the contents of virtually any configuration file. In the examples that follow, one may show the same file ID throughout.

Figure 3:
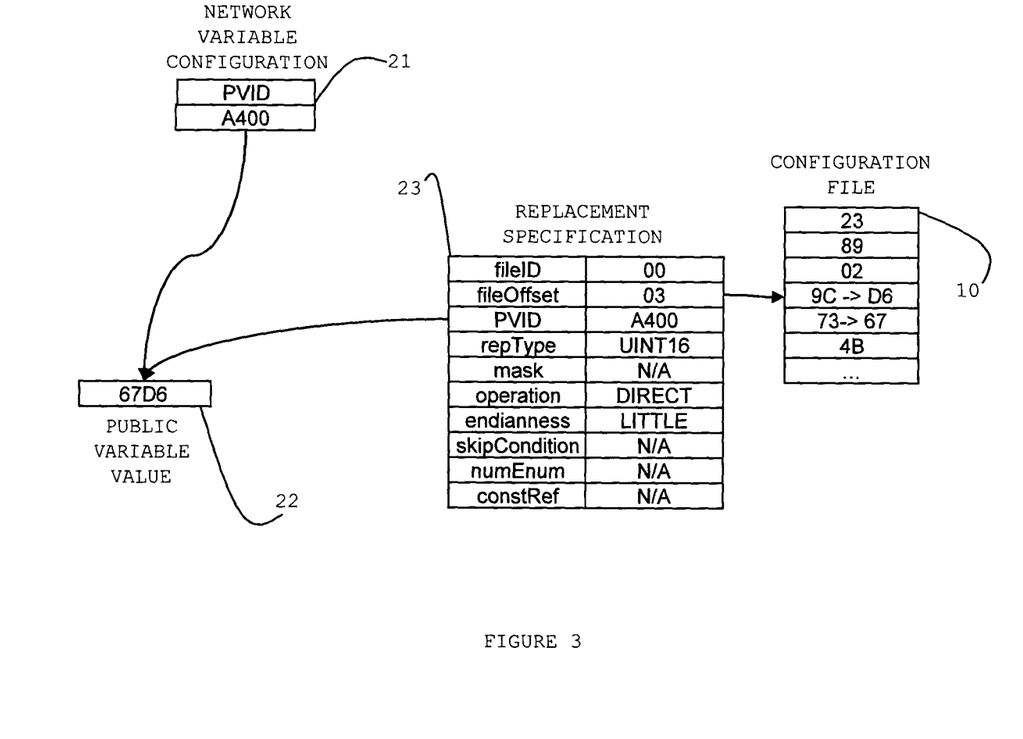
FIG. 3 is a diagram that reveals details of a replacement specification.

FIG. 3 is a diagram that reveals details of the replacement specification 23. The Figure may illustrate an example of a replacement whose specification indicates that the value of the public variable of interest should be stored directly, in its entirety, at an offset within the specified configuration file. The replacement specification may include the operation to be performed to translate the public variable value to configuration data (in this case unconditional DIRECT transfer of the entire value), and the data type into which the data of the public variable should be converted for use as replacement source data (repType). The replacement specification may include the endianness (little or BIG) of the destination in the configuration file, so that either endianness can be supported. In this example, the source data type may be specified as a two byte unsigned integer and the destination as LITTLE endian, so the least significant byte of the public variable value is stored at the file offset specified and the most significant byte of the public variable value is stored at the file offset specified, plus one.

Configuration data may consist of data structures with a variety of field widths and data types including bit fields, enumerations, various sizes of integers, and floating point numbers. To enhance the flexibility available in replacing configuration data, the replacement specifications may be enhanced to include translations of data format and masking to be applied before storing the data in the configuration file. Since the public variable value is ultimately intended to be written by an end user via the network variable, it is important that it be in the most "user friendly" format, which may not necessarily match the format of the configuration data it is intended to manipulate.

Figure 4:
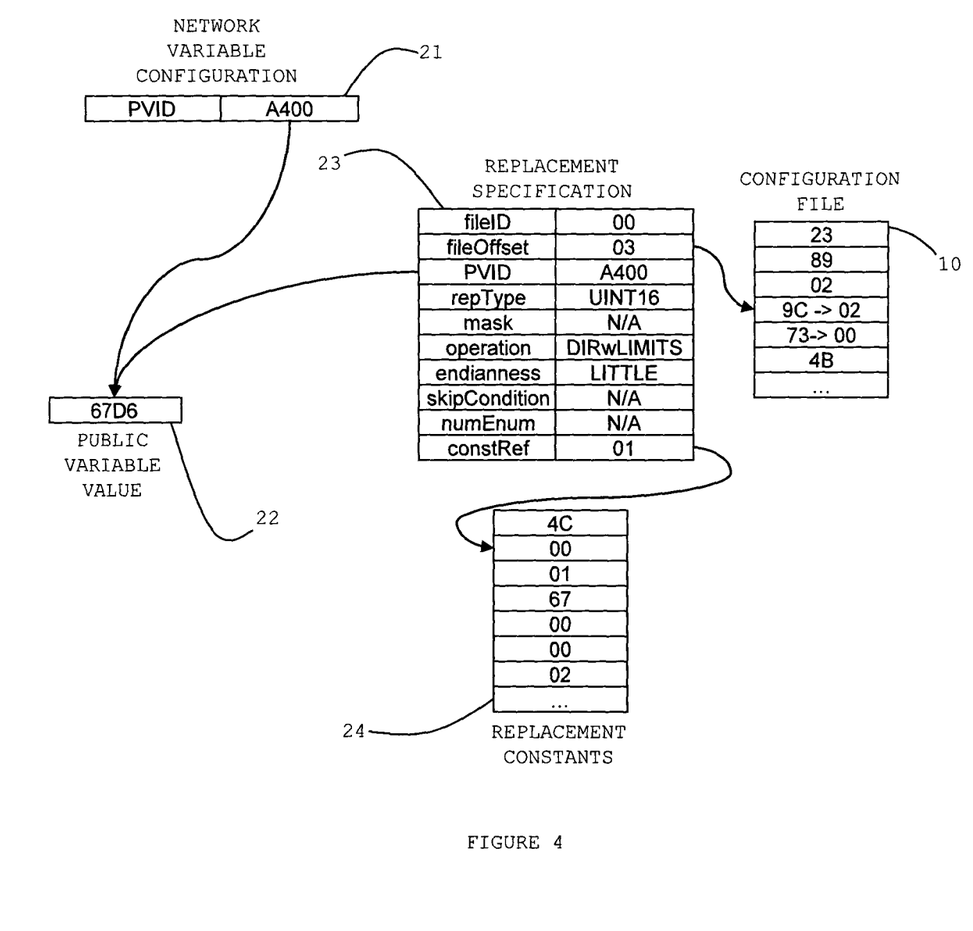
FIG. 4 is a diagram that that shows a replacement constants list.

FIG. 4 is a diagram that shows a replacement constants list 24. The Figure may illustrate one such translation variation in which limits are applied to the public variable data before storing it in the configuration file. The limits to be applied may reside, via reference from the replacement specification, in an additional replacement constants specification, so that such constants can be used generally for any translation purpose that requires constant data to be supplied. In this example, the operation to be performed may be DIRECTwLIMITS. The replacement specification field constRef may be taken as a byte offset into the replacement constants array, at which one expects to find a low limit, high limit and else value (to be used if the public variable data is outside the limits), in the data type of the public variable, in BIG endian byte ordering (if applicable). So in this example, the public variable value 0x67D6 is compared to the low limit 0x0001 and high limit 0x6700 and found to be out of range. If the value had been in range, it may have been stored directly as in the previous example. But since the value is out of range, the "else" value of 0x0002 may be stored instead.

Figure 5:
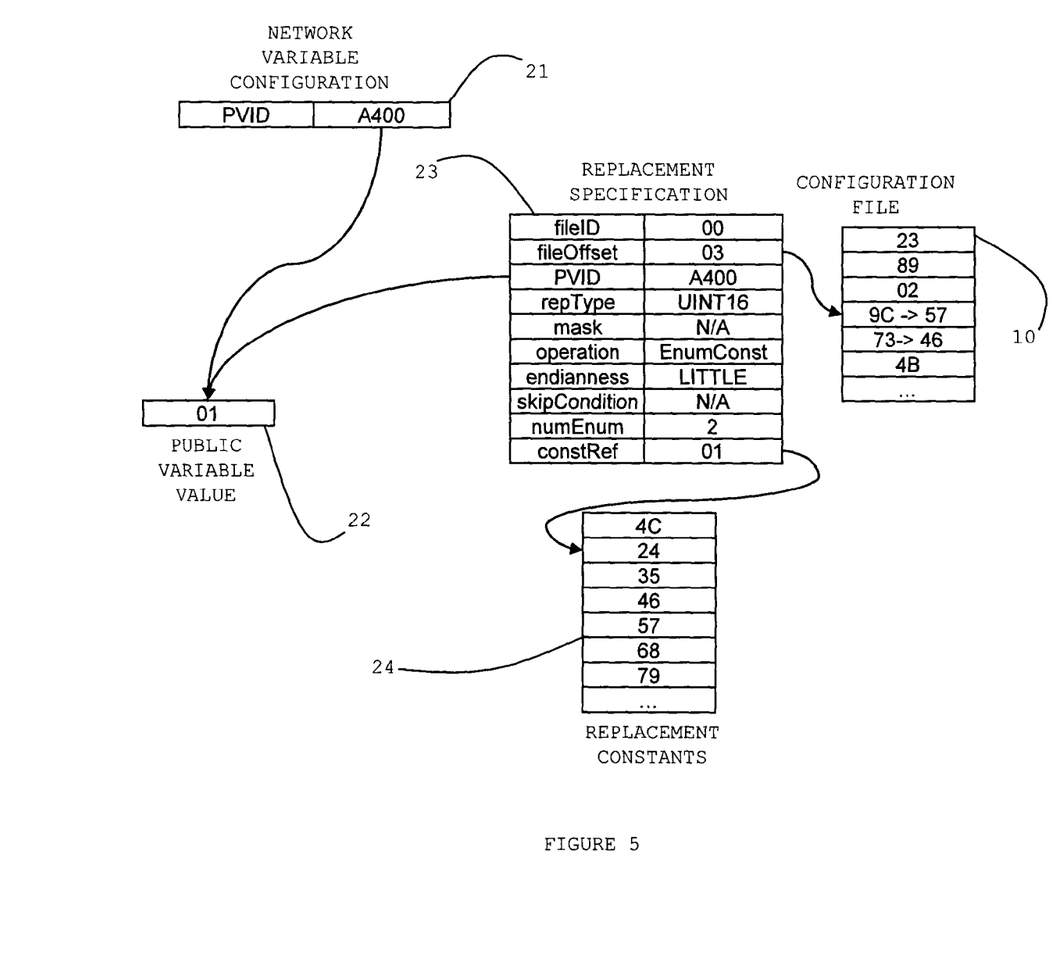
FIG. 5 is another diagram of the replacement constants list with different values.

FIG. 5 is another diagram of the replacement constants list 24 with different values. The Figure may illustrate another translation variation wherein the public variable value is taken as a 0-based enumeration for which a table lookup is performed to find the data to be applied to the configuration file. In this example, the operation to be performed may be EnumConst. The replacement specification may include the number of possible values in the enumeration, as numEnum. One may expect the public variable to range in value from 0 to (numEnum-1).

The replacement specification field constRef may be taken as a byte offset into the replacement constants array, at which one can expect to find a value for each possible enumeration, plus an additional "else" value to be used if the public variable value falls outside the expected range of enumeration values. The public variable value may be expected to be an unsigned byte. The constant data may be expected to be as specified in repType, in BIG endian byte ordering (if applicable). If numEnum is 02 as in this example, one may interpret the constant data at constRef to be 3 UINT16 values: for enumeration value 0, for enumeration value 1, and an "else" value. Since the public variable value is 01, one may use the lookup value for that enumeration and apply it directly to the configuration file.

Figure 6:
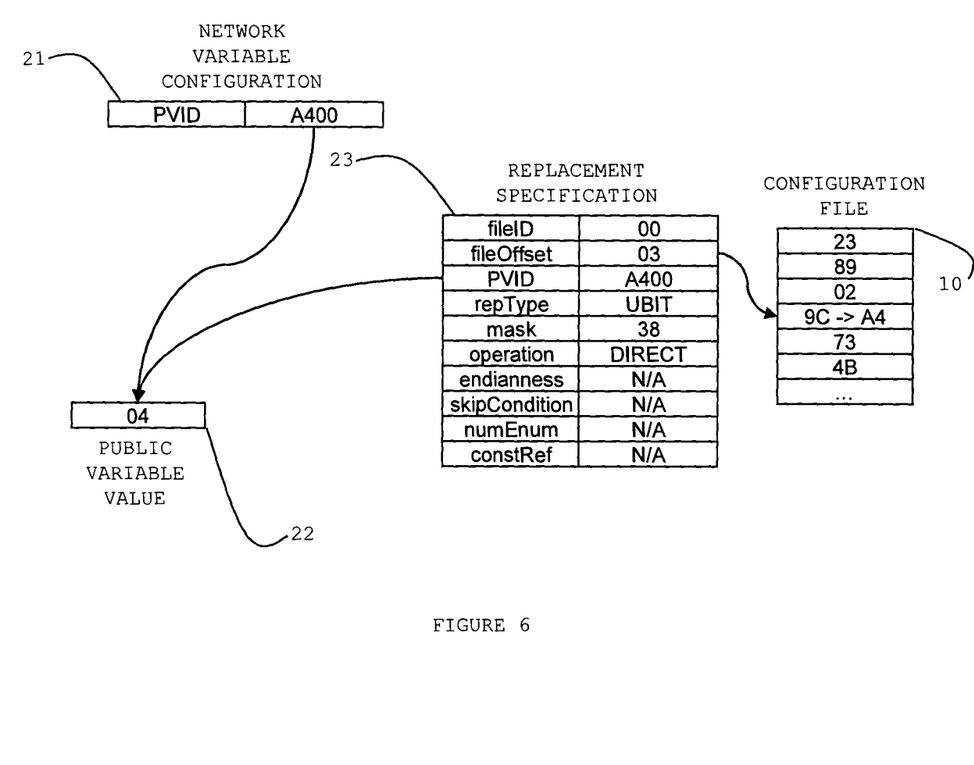
FIG. 6 is a diagram illustrating how a bit field within the configuration file can be manipulated without disturbing any neighboring bits.

FIG. 6 is a diagram of how a bit field within the configuration file can be manipulated without disturbing any neighboring bits. The replacement specification may include a mask which identifies not only the width of the bit field, but also the position of the bits of interest within the configuration file destination byte of interest. The public variable value may be masked and shifted to match the specified mask, then applied to the configuration file. In this example, the mask 0x38=0011 1000 may indicate a 3 bit field in the middle of a byte. The public variable value 0x04 may be shifted left 3 bits to align with the mask (0010 0000), so the bits of interest to be applied are XX10 0XXX. The existing byte in the configuration file 0x9C=1001 1100 may be modified with the field of interest, resulting in 1010 0100=0xA4.

Under certain conditions, it may be desired to skip the replacement operation altogether, leaving the current configuration data unmodified. This feature may permit multiple replacement specifications to act on the same configuration file data, with only one of them actually authorized to make the replacement. In essence, this feature may allow "if/then/else" logic to be implemented in table form so that complicated replacement conditions may be specified.

Figure 7:
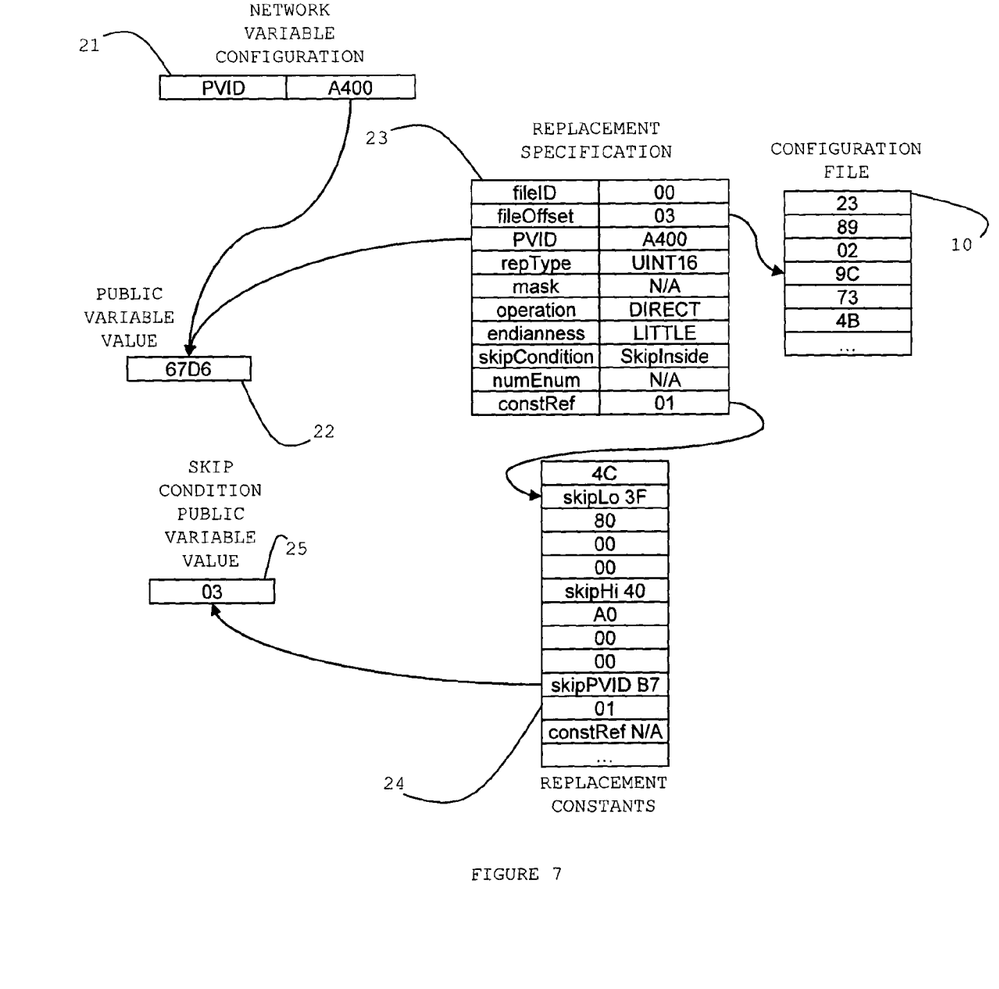
FIG. 7 is a diagram showing a skip condition public variable value.

FIG. 7 is a diagram showing a skip condition public variable value 25. The Figure may illustrate how a replacement may be conditionally skipped. When a non-empty skip operation is included, the replacement may be conditionally skipped. The replacement may be skipped when the range of a chosen skip public variable is either inside or outside a set of low/high limits. When a skip operation is present, the constRef may be taken to refer to a skip descriptor structure consisting of low and high limits, as floats, followed by a skipPVID identifying the public variable to be used as the condition, and finally an additional constRef field. The additional constRef field may serve the purpose of the constRef field in the original replacement specification, which was supplanted to allow a skip descriptor to be referenced. If the replacement operation does not require a constRef, as in this case, the additional constRef field is not necessarily needed.

In this example, the skip descriptor may be located at offset 01 in the replacement constant array. It may specify a low limit of 1.0 (3F800000) and a high limit of 5.0 (40A00000), and a skip PVID of 0xB701. The value of the skip public variable at PVID 0xB701 is 03, or, when converted to a float, 3.0. Since this value lands inside the low/high limits and the skip operation was Skipinside, the replacement operation may be skipped, and no change to the configuration file occurs. If the operation had not been skipped, it may have functioned as if no skip operation had been provided, except that the additional constRef field would have been used instead of the original one.

The translation capabilities outlined here may be flexible enough to address most situations that might be encountered. Additional variations in how replacement data may be translated could be envisioned. The nature of the replacement specification and replacement constants may allow their functionality to be extended as needed by either defining additional replacement operations, adding interpretations of the constant data references, or by adding fields to the replacement specification.

To recap, a system for configuring a controller, without file transfer, may incorporate a processing unit, and a first memory connected to the processing unit. A network variable configuration may be situated in the first memory. The network variable configuration may incorporate a public variable identification (PVID). The public variable identification may identify a public variable whose value is written into a second memory of the processing unit. A replacement specification, which also incorporates a public variable identification, may be read from the first memory. Values may be written to a configuration file in a memory of a controller based on the instructions in the replacement specification.

The network variable configuration may incorporate a public variable identification whose identified public variable is written as the public variable value. The public variable value may be interpreted based on the replacement specification. Values may be written into the configuration file based on the public variable value and the replacement specification. A way that values are written into the configuration file may be determined by a type of operation indicated in the replacement specification.

One or more items incorporated by the replacement specification may be selected from a group consisting of file ID, file offset, PVID, rep type, mask, operation, endianness, skip condition, num enumeration, and constant ref.

One or more configuration file items that are changed may be replaced according to the replacement specifications without changing other configuration file items.

The first memory may be a FLASH memory. The second memory may be a RAM.

An approach for configuring a controller, without a file transfer, may incorporate providing a network variable configuration in terms of a public variable identification to a memory of a processor, writing the public variable to a memory of the processor as a public variable value, reading the public variable value from a memory of the processor, and writing changes to a configuration file according to the value of the public variable and instructions in the replacement specifications. The configuration file may be in a memory of the processor.

The instructions in the replacement specification may show how to translate the public variable value into values to be written to configuration file elements.

The approach may further incorporate moving the configuration file to a memory of a processor in a controller to be configured. When a network variable is written, the controller may access data of the network variable configuration to identify a public variable. The network variable may be mapped via the public variable identification to the public variable. When the network variable is written, a value of the public variable may be changed.

The approach may further incorporate scanning replacement specifications for one or more changes of value in public variables identified as replacement public variables by being present in the replacement specifications. When a change of value is detected, instructions in a replacement specification may indicate how to modify content of a configuration file associated with the public variable.

A replacement specification may incorporate a file ID and a file offset indicating a destination of a replacement in the configuration file, a data type being replaced, a mask so that bit fields can be replaced without affecting adjacent bits, and a type of operation for providing replacement data. A type of operation may be selected from a group consisting of direct replacement where the public variable value is replacement data, direct replacement with limits where a public variable value outside the limits results in a predetermined else replacement data value, or an enumerated replacement where the public variable value is an index for a table of replacement data values.

A data type being replaced may be into which type the data of the public variable is converted as replacement source data.

A replacement specification may further incorporate an endianness of little or big of a destination in the configuration file.

A replacement by an operation of the replacement specification may be skipped when a value of a skip condition public variable meets a predetermined set of values.

A mechanism for configuring a controller, without a file transfer, in a building automation system, may incorporate a processing unit, and a first memory connected to the processing unit. A network variable configuration may be situated in the first memory. The network variable configuration may include a public variable identification (PVID). The public variable identification may identify a public variable whose value is written into a second memory of the processing unit. A replacement specification, which also includes a public variable identification, may be read from the first memory. Values may be written to a configuration file in a memory of a controller based on the instructions in the replacement specification.

The mechanism may further incorporate one or more additional replacement specifications. Each replacement specification may incorporate a file ID and a file offset representing a destination of the respective replacement specification.

Each replacement specification may incorporate a data type being replaced, a mask so that bit fields can be replaced without affecting adjacent bits, and a type of operation for getting replacement data. A type of operation may be selected from a group consisting of direct replacement where the public variable value is the replacement data, direct replacement with limits where a public variable value outside the limits results in a predetermined else replacement data value, or enumerated replacement where the public variable value is used as an index into a table of replacement data values.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for configuring a controller without a file transfer, comprising:
 a configurable controller, the configurable controller comprising:
  a processing unit;
  a first memory connected to the processing unit; and
  a second memory connected to the processing unit; and
 wherein:
 a network variable configuration is situated in the first memory;
 the network variable configuration comprises a public variable identification (PVID);
 the public variable identification identifies a public variable whose value is written into the second memory of the processing unit;
 a replacement specification which also comprises a public variable identification, is read from the first memory, the replacement specification configured to identify a change of value in the public variable; and
 public variable values are input by an end-user without a file transfer from another device and are written to a configuration file in a memory of a controller based on the instructions in the replacement specification.

2. The system of claim 1, wherein the network variable configuration comprises a public variable identification whose identified public variable is written as the public variable value.

3. The system of claim 2, wherein the public variable value is interpreted based on the replacement specification.

4. The system of claim 3, wherein:
 values are written into the configuration file based on the public variable value and the replacement specification; and
 a way that values are written into the configuration file is determined by a type of operation indicated in the replacement specification.

5. The system of claim 4, wherein one or more items comprised by the replacement specification are selected from a group consisting of file ID, file offset, PVID, rep type, mask, operation, endianness, skip condition, num enumeration, and constant ref.

6. The system of claim 1, wherein one or more configuration file items that are changed are replaced according to the replacement specifications without changing other configuration file items.

7. The system of claim 1, wherein:
 the first memory is a FLASH memory; and
 the second memory is a RAM.

8. A method for configuring a controller without a file transfer, comprising:
 providing a network variable configuration in terms of a public variable identification to a memory of a processor of a configurable controller;
 writing the public variable to a memory of the processor as a public variable value;
 reading the public variable value from a memory of the processor; and
 writing changes received from an end-user to a configuration file according to the value of the public variable and instructions in the replacement specifications without receiving a file transfer from another device;
 scanning replacement specifications for one or more changes of value in public variables identified as replacement public variables by being present in the replacement specifications; and
 when a change of value is detected, instructions in a replacement specification indicate how to modify content of a configuration file associated with the public variable; and
 wherein the configuration file is in a memory of the processor.

9. The method of claim 8, wherein the instructions in the replacement specification show how to translate the public variable value into values to be written to configuration file elements.

10. The method of claim 8, further comprising moving the configuration file to a memory of a processor in a controller to be configured.

11. The method of claim 10, wherein:
 when a network variable is written, the controller accesses data of the network variable configuration to identify a public variable; and
 the network variable is mapped via the public variable identification to the public variable.

12. The method of claim 11, when the network variable is written, a value of the public variable is changed.

13. The method of claim 8, wherein a replacement specification comprises a file ID and a file offset indicating a destination of a replacement in the configuration file, a data type being replaced, a mask so that bit fields can be replaced without affecting adjacent bits, and a type of operation for providing replacement data.

14. The method of claim 13, wherein a type of operation is selected from a group consisting of direct replacement where the public variable value is replacement data, direct replacement with limits where a public variable value outside the limits results in a predetermined else replacement data value, or an enumerated replacement where the public variable value is an index for a table of replacement data values.

15. The method of claim 13, where a data type being replaced is into which type the data of the public variable is converted as replacement source data.

16. The method of claim 13, wherein a replacement specification further comprises an endianness of little or big of a destination in the configuration file.

17. The method of claim 9, wherein a replacement by an operation of the replacement specification is skipped when a value of a skip condition public variable meets a predetermined set of values.

18. A mechanism for configuring a controller, without a file transfer, in a building automation system, comprising:
 a configurable controller, the configurable controller comprising:
  a processing unit; and
  a first memory connected to the processing unit; and
 wherein:
 a network variable configuration is situated in the first memory;
 the network variable configuration includes a public variable identification (PVID);
 the public variable identification identifies a public variable whose value is written into a second memory of the processing unit;
 a replacement specification which also includes a public variable identification, is read from the first memory;
 values are written to a configuration file in a memory of a controller based on the instructions in the replacement specification without a file transfer from another device;
 the first memory is a FLASH memory; and
 the second memory is a RAM.

19. The mechanism of claim 18, further comprising one or more additional replacement specifications.

20. The mechanism of claim 19, wherein each replacement specification incorporates a file ID and a file offset representing a destination of the respective replacement specification.

21. The mechanism of claim 19, wherein each replacement specification incorporates a data type being replaced, a mask so that bit fields can be replaced without affecting adjacent bits, and a type of operation for getting replacement data.

22. The mechanism of claim 21, wherein a type of operation may be selected from a group consisting of direct replacement where the public variable value is the replacement data, direct replacement with limits where a public variable value outside the limits results in a predetermined else replacement data value, or enumerated replacement where the public variable value is used as an index into a table of replacement data values.

* * * * *